United States Patent [19]
Kifuku et al.

[11] Patent Number: 6,107,926
[45] Date of Patent: Aug. 22, 2000

[54] LOAD SHORT-CIRCUIT FAILURE DETECTION METHOD AND APPARATUS AND ELECTRIC POWER STEERING DEVICE

[75] Inventors: Takayuki Kifuku; Shunichi Wada, both of Tokyo-to, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/934,772

[22] Filed: Sep. 22, 1997

[30] Foreign Application Priority Data

Dec. 25, 1996 [JP] Japan .................................. 8-345763

[51] Int. Cl.[7] .................................................. G08B 21/00
[52] U.S. Cl. ........................... 340/650; 340/73; 318/332; 318/432; 318/343; 324/546
[58] Field of Search ..................... 340/650, 73; 318/332, 318/432, 343; 324/546; 327/380; 351/5; 73/2

[56] References Cited

U.S. PATENT DOCUMENTS

| 4,259,659 | 3/1981 | Ariyoshi et al. ........................ 340/73 |
| 4,620,140 | 10/1986 | Chonan ................................... 318/332 |
| 4,753,309 | 6/1988 | Marumoto et al. .................... 180/79.1 |
| 4,959,787 | 9/1990 | Morishita et al. ................. 364/424.05 |
| 4,987,964 | 1/1991 | Tabuse ................................... 180/79.1 |
| 5,483,817 | 1/1996 | Renard et al. ............................... 73/2 |
| 5,631,529 | 5/1997 | Shimuzu et al. ....................... 318/432 |
| 5,652,487 | 7/1997 | Nishino et al. ......................... 318/343 |

FOREIGN PATENT DOCUMENTS

| 61-169366 | 7/1986 | Japan .............................. B62D 5/04 |
| 2-162159 | 6/1990 | Japan . |
| 3-256514 | 11/1991 | Japan . |

*Primary Examiner*—Jeffery A. Hofsass
*Assistant Examiner*—Tai T. Nguyen
*Attorney, Agent, or Firm*—Sughrue, Mion, Zinn, Macpeak & Seas, PLLC

[57] ABSTRACT

A load short-circuit failure detection apparatus comprises load current drive means 8, load current control means 7, load current detection means 6 and load short-circuit failure judging means 9 and judges that a short-circuit failure occurs in a load when a state in which a load current detection value exceeds a predetermined value within a first predetermined time continues for a second predetermined time so that the load drive means can be protected, a short-circuit failure of the load can be detected, and the erroneous detection of a short-circuit failure caused by a transient overcurrent can be prevented.

13 Claims, 13 Drawing Sheets

(a)

(b)

(c)

LOAD SHORT-CIRCUIT FAILURE DETECTION METHOD AND APPARATUS AND ELECTRIC POWER STEERING DEVICE

BACKGROUND OF THE INVENTION

1. Field of the Invention

This invention relates to load failure detection in the drive unit of an electric load and, particularly, to a load short-circuit failure detection method and apparatus for an electric power steering device and the like.

2. Prior Art

Heretofore, as a load short-circuit failure detection method for an electric power steering device, as disclosed in Laid-open Japanese Patent Application No. Hei 2-162159, for example, there has been used a method in which current detection means is provided in a motor drive circuit to detect a drive current (load current) for the motor and it is judged whether a steering motor as a load is short-circuited by judging whether the detected current value is within a predetermined range. Laid-open Japanese Patent Application No. Hei 3-256514 discloses a method for detecting a short-circuit state of an electric drive actuator which is an inductive load like the above motor, in which load current detection means is provided in an actuator drive circuit to detect a current of the above load and the short-circuit state of the actuator is detected by comparing the detected current value with the predetermined smallest value and largest value of drive current.

However, in the above conventional method for detecting a load short-circuit failure, for instance, even when an excessive load current runs temporarily by quick steering operation or the like, it is erroneously detected that the motor (or the actuator) is short-circuited and the apparatus is stopped erroneously in spite of the fact that there is no abnormality in the apparatus.

Laid-open Japanese Patent Application No. Sho 61-169366 discloses a method for preventing the above erroneous detection by setting a short-circuit decision time when a short-circuit failure of the load (motor) of an electric power steering device is to be detected. FIG. 13 is a diagram showing the configuration of the above electric power steering device. In the figure, reference numeral 1 denotes a steering wheel, 2 a torque sensor for detecting a steering torque, 3 tires, 4 a motor as an electric load to be detected for its short-circuit failure, 5 a power source for supply a current to the motor 4, 6 load current detection means for detecting a current running through the motor 4, 7 load current control means for controlling a motor drive current (load current) based on the steering torque detection value of the torque sensor 2 and the load current detection value of the load current detection means 6, and 8 load drive means for driving the motor 4 as a load in accordance with the output of the load current control means 7. In the figure, reference numeral 9 represents load short-circuit failure judging means for judging a short-circuit failure of the above motor 4 and taking a fail-safe action for cutting off power supply to the motor 4 when it judges that a short-circuit failure occurs in the motor 4, short-circuit current judging means 10 for judging whether the load current detection value of the load current detection means 6 is larger than a predetermined current value which is considered as a short circuit of the load, 11 a microcomputer which stores a program for judging a short-circuit failure, and 12 power switch means for cutting off power supply from the power source 5 to the motor 4 when the load short-circuit failure judging means 9 judges that a short-circuit failure occurs in the motor 4.

A description is subsequently given of a load short-circuit failure detection method in the above configured electric power steering device. A load current running through the motor 4 driven by the load drive means 8 is detected by the load current detection means 6 and applied to the short-circuit current judging means 10. The short-circuit current judging means 10 judges whether the applied detection value of the load current is larger than a predetermined value (short-circuit current decision value) and applies the result of this judgment to the microcomputer 11. Since an excessive load current (short-circuit current) runs through the motor 4 when the motor 4 is driven in the state of a short-circuit failure, the above short-circuit current decision value is set to a value equivalent to a short-circuit current, whereby the microcomputer 11 can detect a short-circuit failure. At this point, the microcomputer 11 measures a time during which the above short-circuit current continues and judges that a short-circuit failure occurs in the motor 4 when this continuation time exceeds a predetermined time (short-circuit decision time). The microcomputer 11 opens the power switch means 12 when it judges that a short-circuit failure occurs in the motor 4 and takes a fail-safe action for cutting off the connection between the power source 5 and the motor 4. On the other hand, when the detection value of the load-current falls below the short-circuit decision value before the passage of the short-circuit decision time, the microcomputer 11 judges that the above excessive load current is a transient large current caused by a sudden change in the target current and not by a short-circuit failure and keeps controlling electric power steering without taking a fail-safe action.

However, since the conventional load short-circuit controller is, as described above, configured such that it feeds back a load current detected by the load current detection means 6 to the load current control means 7 to control the drive current of the motor 4 in order to protect the load drive means 8, a load current (short-circuit current) which runs into the motor 4 at the time of a failure such as a short circuit of a load or the grounding of a wiring for a load oscillates. Therefore, as the amplitude of the above short-circuit current does not simply increase but changes around the above short-circuit current decision value, the measured short-circuit current continuation time does not reach the above short-circuit decision time. Therefore, the above conventional load short-circuit controller cannot detect a load short-circuit failure and hence, cannot take a fail-safe action such as alarming or the like.

SUMMARY OF THE INVENTION

It is therefore an object of the present invention which has been made to solve the above problem to provide a load short-circuit failure detection method for detecting a short-circuit failure of a load without fail when a short-circuit failure occurs in the load while load drive means is protected by the feed-back function of load current control means and free from erroneous detection when a transient excessive load current runs due to a sudden change in target current or the like as well as an apparatus for practicing the same.

It is another object of the present invention to provide a load short-circuit failure detection apparatus which can protect load drive means after judgment of a load short-circuit failure without fail and warn the driver or the like of the result of judgment of the load short-circuit failure.

It is still another object of the present invention to provide an electric power steering device equipped with the above load short-circuit failure detection apparatus.

According to a first aspect of the present invention, there is provided a load short-circuit failure detection method wherein a short-circuit failure of a load is determined when a state in which a load current detection value exceeds a predetermined value within a first predetermined time continues for a second predetermined time.

According to a second aspect of the present invention, there is provided a load short-circuit failure detection apparatus which comprises:

load current detection means; and load short-circuit failure judging means which determines a short-circuit failure of a load when a state in which a current detection value detected by the load current detection means exceeds a predetermined value within a first predetermined time continues for a second predetermined value.

According to a third aspect of the present invention, there is provided a load short-circuit failure detection apparatus which comprises:

load current detection means;

largest current retaining means for retaining the largest value of current detection values detected by the load current detection means for a first predetermined time; and load short-circuit failure judging means which determines a short-circuit failure of a load when a state in which the largest current value retained by the largest current retaining means exceeds a predetermined value continues for a second predetermined value.

According to a fourth aspect of the present invention, there is provided a load short-circuit failure detection apparatus wherein the load short-circuit failure judging means is constructed by software by sampling a current detection value detected by the load current detection means and the first predetermined time is equal to or longer than the judging cycle of a load short-circuit failure.

According to a fifth aspect of the present invention, there is provided a load short-circuit failure detection apparatus comprising load current control means, wherein the load current control means and the load short-circuit failure judging means are constructed by software by sampling a current detection value detected by the load current detection means, and the sampling cycle of a load current used for judging a load short-circuit failure is equal to or shorter than the control cycle of a load current.

According to a sixth aspect of the present invention, there is provided a load short-circuit failure detection apparatus comprising load current control means, wherein the load current control means and the load short-circuit failure judging means are constructed by software by sampling a current detection value detected by the load current detection means and a load short-circuit failure is determined based on a load current detection value used for controlling a load current.

According to a seventh aspect of the present invention, there is provided a load short-circuit failure detection apparatus comprising load drive means, wherein the driving of a load by the load drive means is stopped and its state is kept when the load short-circuit failure judging means determines a failure.

According to an eighth aspect of the present invention, there is provided a load short-circuit failure detection apparatus comprising load drive means and switch means provided between a power source or a ground and the load drive means, wherein the switch means is opened and its state is kept when the load short-circuit failure judging means determines a failure.

According to a ninth aspect of the present invention, there is provided a load short-circuit failure detection apparatus comprising load drive means and switch means provided in a closed circuit formed by the load drive means and a load, wherein the switch means is opened and its state is kept when the load short-circuit failure judging means determines a failure.

According to a tenth aspect of the present invention, there is provided a load short-circuit failure detection apparatus comprising an alarm unit such as a lamp, wherein an alarm is given when the load short-circuit failure judging means judges that a failure occurs in a load.

According to an eleventh aspect of the present invention, there is provided an electric power steering device equipped with the load short-circuit failure detection apparatus of the second or third aspect which comprises load drive means, load current control means, and a motor for assisting steering force, wherein a motor current is detected by the load short-circuit failure judging means, the motor is driven by the load drive means, and a motor current is controlled by the load current control means.

According to a twelfth aspect of the present invention, there is provided an electric power steering device comprising clutch means, load current control means and a motor for assisting steering force, wherein the clutch means disconnects the motor from a steering system mechanically and its state is kept when the load short-circuit failure judging means determines a failure.

The above and other objectives, features and advantages of the invention will become more apparent from the following description when taken in conjunction with the accompanying drawings.

DETAILED DESCRIPTION OF THE PREFERRED EMBODIMENTS

Figure 1:
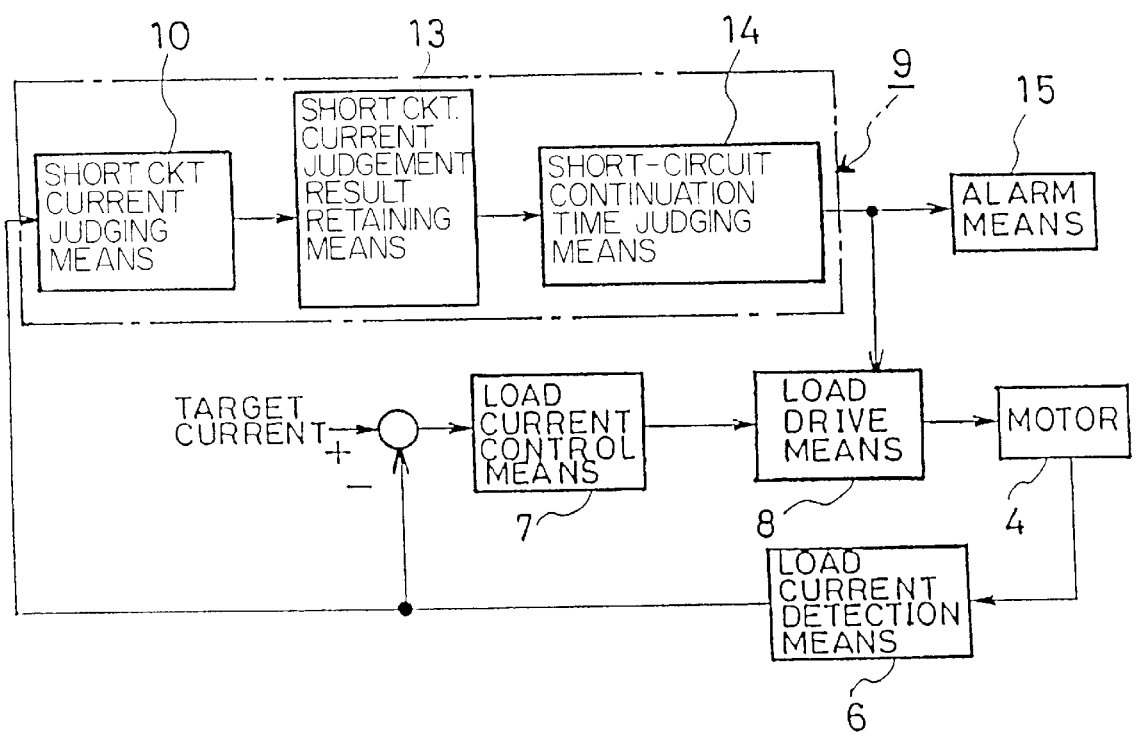
FIG. 1 is a block diagram of a load short-circuit failure detection apparatus according to Embodiment 1 of the present invention.

Preferred embodiments of the present invention are described hereinunder with reference to the accompanying drawings.

In the following description, the same or corresponding parts as in the prior art are denoted by the same reference numerals.

Embodiment 1

FIG. 1 is a function block diagram of a load short-circuit failure detection apparatus according to Embodiment 1 of the present invention. In FIG. 1, reference numeral 4 denotes a motor which is an electric load to be detected for its short-circuit failure; 6 denotes a load current detection means for detecting a current running through the motor 4, 7 denotes a load current control means for controlling a load current (motor drive current) such that it follows a target current based on the target current and the load current detection value of the load current detection means 6, and 8 denotes a load drive means for driving the motor 4 as a load in accordance with the output of the load current control means 7. In the figure, reference numeral 9 denotes load short-circuit failure judging means for judging a short-circuit failure of the motor 4, 10 denotes a short-circuit current judging means for judging whether the load current detection value of the load current detection means 6 is larger than a predetermined current value (short-circuit current) which is considered as a short circuit of the load, 13 denotes a short-circuit current judgment result retaining means for retaining the result of judgment of the short-circuit current judging means 10 for a predetermined time, 14 short-circuit continuation time judging means, and 15 alarm means. The above short-circuit continuation time judging means 14 prohibits the load drive means from driving the load and causes the alarm means to give an alarm when the result of judgment of a short-circuit current retained by the short-circuit current judgment result retaining means 13 indicates a short-circuit failure of the load for more than a predetermined time.

Figure 2:
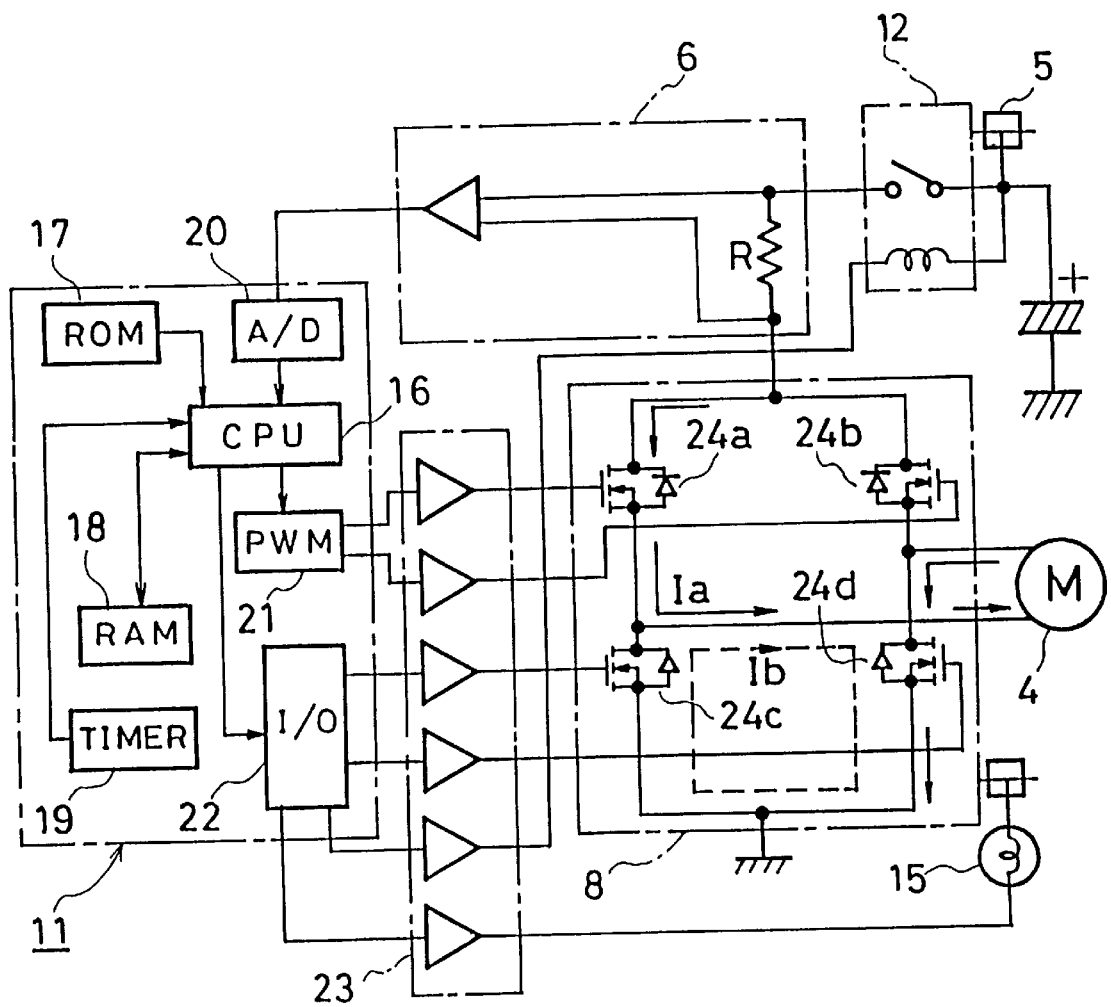
FIG. 2 is a circuit example of the load short-circuit failure detection apparatus according to Embodiment 1 of the present invention.

FIG. 2 shows a circuit example of the load short-circuit failure detection apparatus of theabove Embodiment 1. In the figure, reference numeral 4 represents a motor, 5 a power source for supplying a current to a load such as the motor 4, 6 load detection means which detects a current running through a resistor R connected in series to the motor 4 in this embodiment, and 8 load drive means consisting of 4 MOS FETs 24 (24a to 24d) constituting a bridge circuit. Reference numeral 11 designates a microcomputer comprising a CPU 16, a ROM 17 for storing a control program and the like, a RAM 18 for temporarily storing data on a load current and the like, a timer 19 for counting the execution cycle of a program, an A/D converter 20 for supplying the load current detection value of the load current detection means 6 to the CPU 16, a PWM timer 21 for setting the duty ratio of a drive current for the motor 4, and an I/O port 22. This microcomputer 11 attains the functions of the load current control means 7 and the load short-circuit failure judging means 9 consisting of the short-circuit current judging means 10, the short-circuit current judgment result retaining means 13 and the short-circuit continuation time judging means 14. Reference numeral 12 denotes power switch means for connecting or disconnecting the power source 5 from the load drive means 8 and a relay is used as the power switch means 12 in this embodiment. Numeral 15 represents alarm means and a lamp is used as the alarm means in this embodiment. The MOS FETs 24a and 24b of the load drive means 8 are connected to the PWM timer 21 of the microcomputer 11 through a buffer 23 and the MOS FETs 24c and 24d of the load drive means 8, the power switch means 12 and the alarm means 15 are connected to the I/O port 22 of the microcomputer 11 through the buffer 23. The MOSFETs 24c and 24d of the load drive means 8 are connected to the I/O port 22 through the buffer 23.

A description is subsequently given of the basic operations of the load current control means 7 and the load short-circuit failure judging means 9 of the above circuit. First, the CPU 16 which is the load current control mean 7 reads a detection current detected by the load current detection means 6 through the A/D converter 20 at intervals of a predetermined time and calculates the duty ratio of a drive current for the motor 4 to make a given predetermined target current and the detection current equal to each other. Thereafter, the CPU 16 which is the load short-circuit failure judging means 9 judges a load short-circuit failure based on the detection current. When the detection current is normal, the PWM timer 21 and the I/O port 22 are set in accordance with the above duty ratio and a desired energization direction, and the motor 4 is PWM driven through the buffer 23 and the load drive means 8. As for the PWM drive of the motor 4, when the duty ratio of the MOS FET 24a is set to a predetermined value, that of the MOS FET 24b to 0% (that is, the MOS FET 24b is turned off), the MOS FET 24c is turned off and the MOS FET 24d is turned on by the I/O port 22, the drive current of the motor 4 runs through a route Ia as shown by a solid line in FIG. 2 when the MOS FET 24a is on. When the MOS FET 24a is off, the drive current of the motor 4 runs through a route Ib as shown by a dotted line in FIG. 2.

When the CPU 16 as the load short-circuit failure judging means 9 determines a short-circuit failure, the CPU 16 sets the PWM timer 21 and the I/O port 22 such that all the MOS FETs 24 are turned off, activates the alarm means 15 to give an alarm, and opens the power switch means 12 to set the I/O port 22 such that the power source 5 is disconnected from the motor 4.

Figure 3:
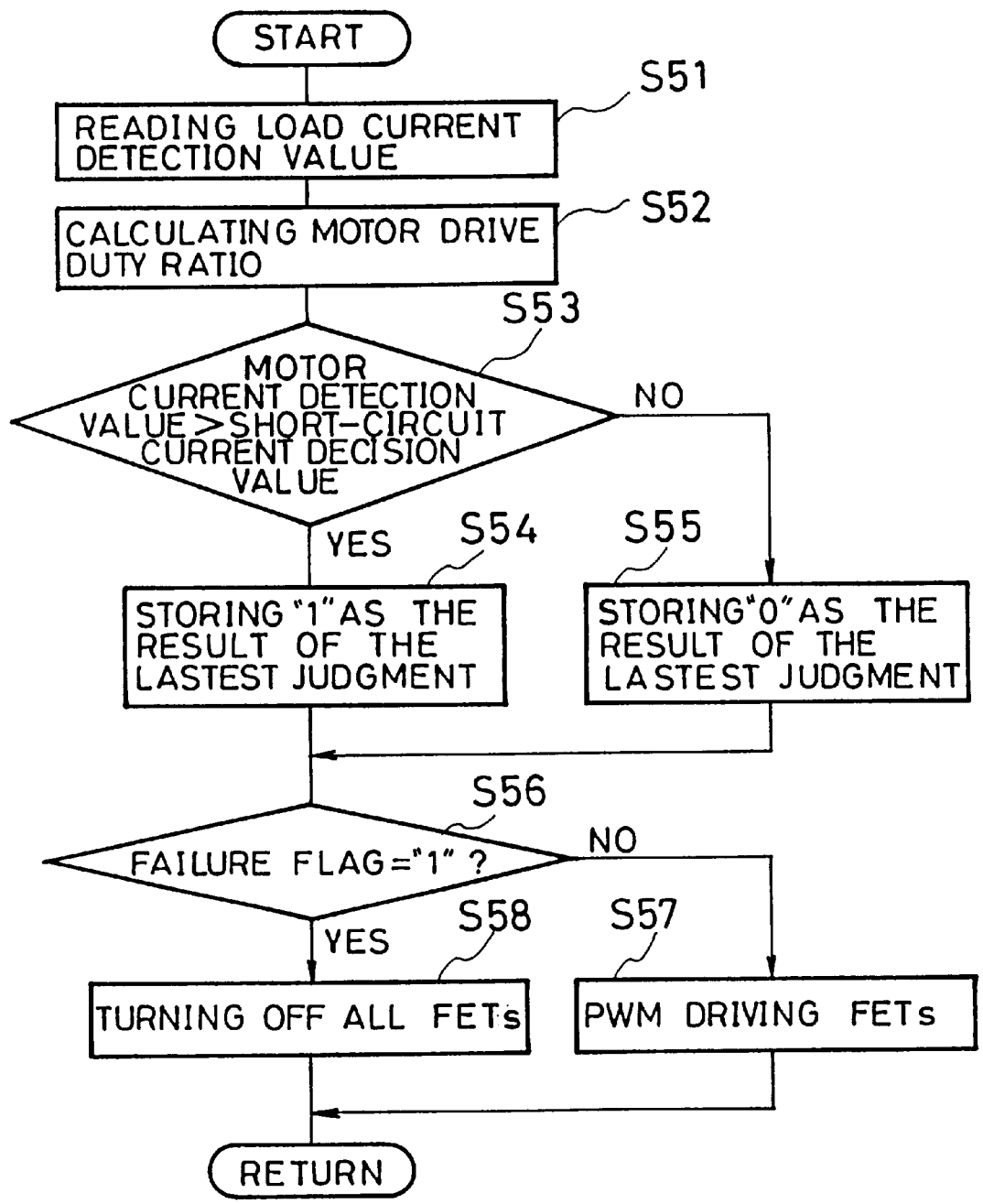
FIG. 3 is a flow chart for explaining the operations of the load current control means and the short-circuit current judging means and short-circuit current judgment result retaining means of the load short-circuit judging means of the load short-circuit failure detection apparatus according to Embodiment 1 of the present invention.

The operations of the short-circuit current judging means 10 and the short-circuit current judgment result retaining means 13 of the load short-circuit failure judging means 9 out of the above basic operations are described in detail with reference to the flow chart of FIG. 3. Processings from the following steps S51 to S58 are read and executed at intervals of a predetermined cycle T1 (T1 is the control cycle of the drive current of the motor 4).

The CPU 16 reads a load current detection value detected by the load current detection means 6 through the A/D converter 20 at intervals of a predetermined sampling time T1 (step S51) and calculates the duty ratio of the drive current of the motor 4 for feed-back control of the motor current (step S52). This step S52 corresponds to the load current control means 7. Thereafter, the CPU 16 judges whether the load current detection value read in the step S51 is an excessive value which is considered as a short-circuit current (step S53) and stores 1 in the RAM 18 when the load current detection value is considered as a short-circuit current (step S54) and 0 in the RAM 18 when the load current detection value is normal (step S55). The results of judgment during the period from the current time to a predetermined retention time T2 are stored in the above RAM 18 and the previous results of judgment are erased sequentially. The above steps S54 and S55 correspond to the short-circuit current judgment result retaining means 13. Thereafter, the state of a failure flag determined by the short-circuit continuation time judging means 14 of the load short-circuit failure judging means 9 to be described hereinafter is checked (step S56). When the failure flag indicates "0" (the result of judgment from the load short-circuit failure judging means 9 indicates normal operation), the motor 4 is PWM driven by the load drive means 8 in accordance with the duty rate calculated in step S52 (step S57). When the failure flag indicates "1" (the result of judgment from the load short-circuit failure judging means 9 indicates a load short-circuit failure), the MOS FETs 24 of the load drive means 8 are all turned off to stop driving the motor 4 (step S58). The above steps S56 to S58 correspond to the load drive means 8.

Figure 4:
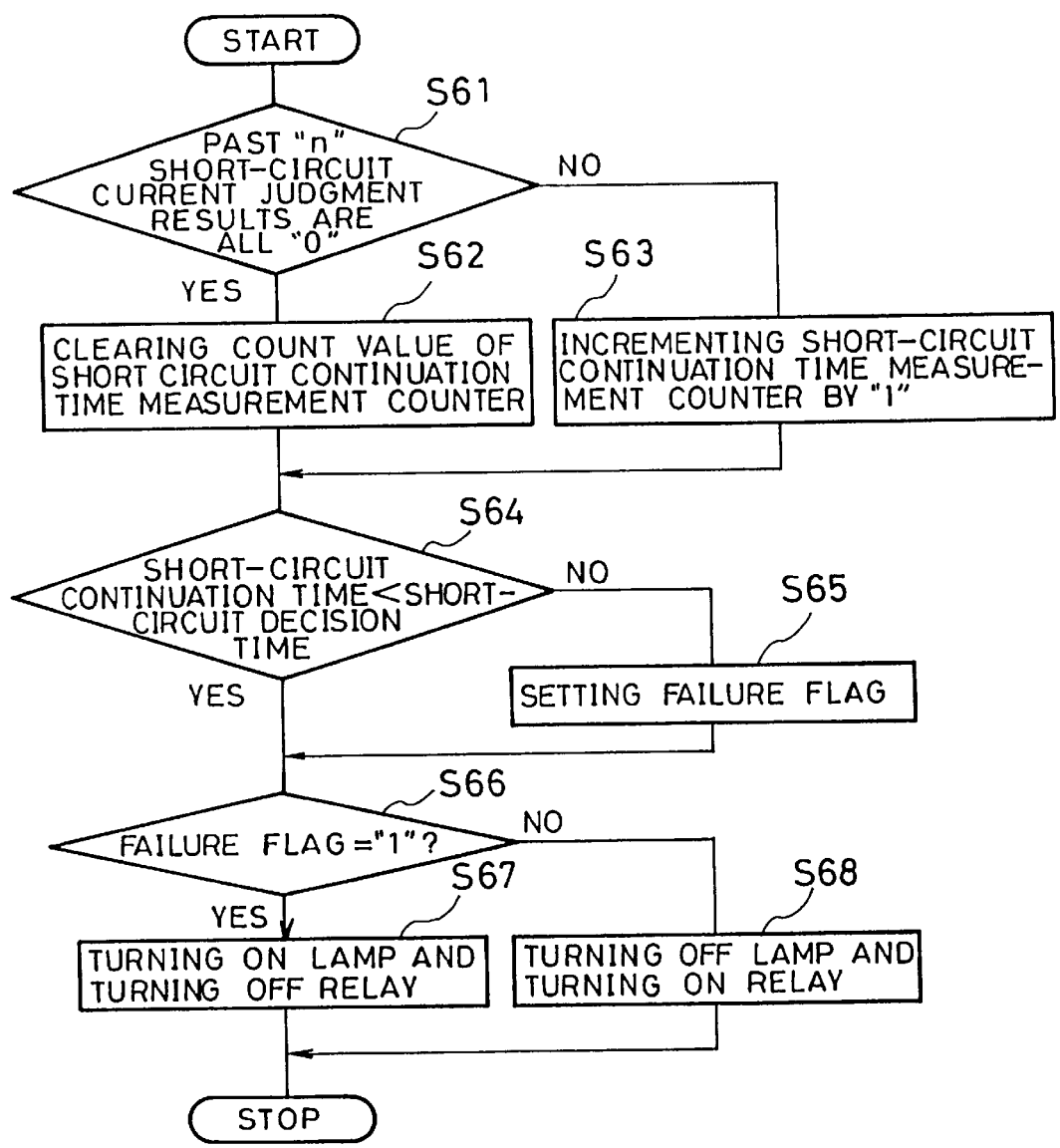
FIG. 4 is a flow chart for explaining the operation of the short-circuit continuation time judging means of the load short-circuit failure detection apparatus according to Embodiment 1 of the present invention.

A program for judging a load short-circuit failure using the results of judgment during the period of the retention time T2 which are stored in the RAM 18 sequentially in the above step S54 or S55, that is, the operation of the short-circuit continuation time judging means 14 of the load short-circuit failure judging means 9 is described in detail with reference to the flow chart of FIG. 4. The short-circuit continuation time judging means 14 checks the results of judgment during the period of the retention time T2 which are stored in the RAM 18 sequentially (step S61). When all the results of judgment during the past retention time T2 indicate normal operation, the count value of a counter for counting a short-circuit continuation time is cleared (step S62). When only one of the results of judgment indicates a short circuit, the count value of the counter is incremented by "1" (step S63) and the measurement of the short-circuit continuation time is continued. It is judged whether the measurement result of the short-circuit continuation time by the counter exceeds a predetermined short-circuit decision time Tz (step S64). When the result exceeds Tz, "1" is set in the failure flag (step S65). Finally, the state of the above failure flag is checked (step S66). When it indicates a failure, the alarm means 15 is caused to give an alarm, and the power switch means 12 is opened to cut off power supply to the load drive means 8 (step S67). When the failure flag indicates normal operation, the alarm means 15 is turned off, and the power switch means 12 is closed to supply power to the load drive means 8 (step S68). Since the state of the failure flag in step S56 of the flow chart of FIG. 3 is determined by the result of judgment in the above step S64, when the failure flag indicates a failure, the MOS FETS 24 of the load drive means 8 are all turned off and the driving of the motor 4 is stopped as described above. The failure flag is initialized to "0" after the microcomputer 11 is powered on and reset. After "1" is set in the failure flag, "1" is retained until power supply to the microcomputer 11 is cut off.

The processings from the step S61 to S68 are read and executed at intervals of a predetermined time T3 (T3 is the measurement cycle of a short-circuit continuation time).

Figure 5:
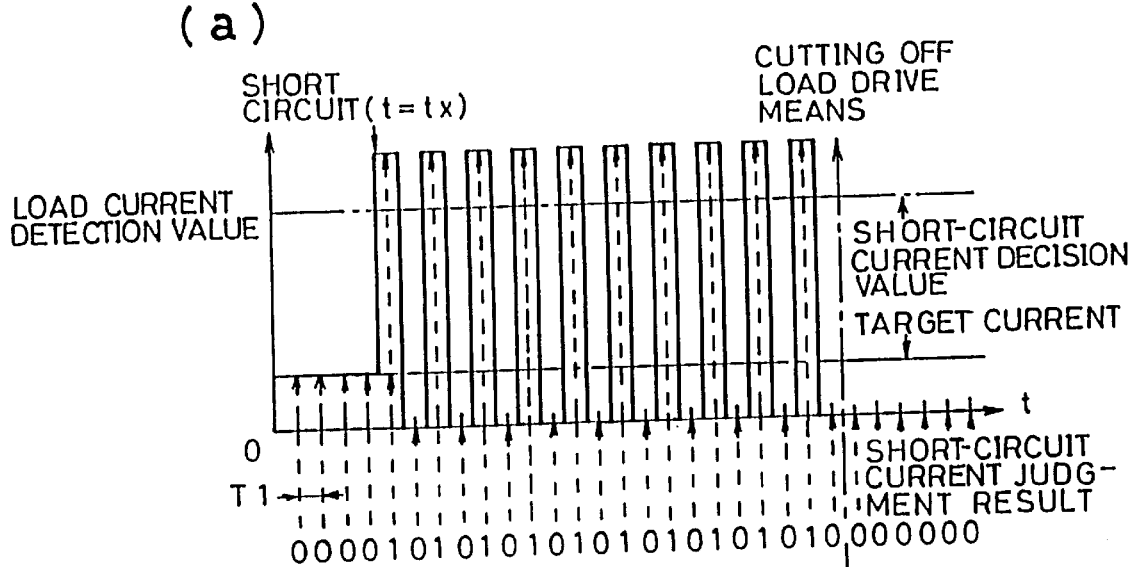
FIG. 5 is a diagram for explaining the operation of Embodiment 1 of the present invention at the time of a load short-circuit failure.
Figure 5:
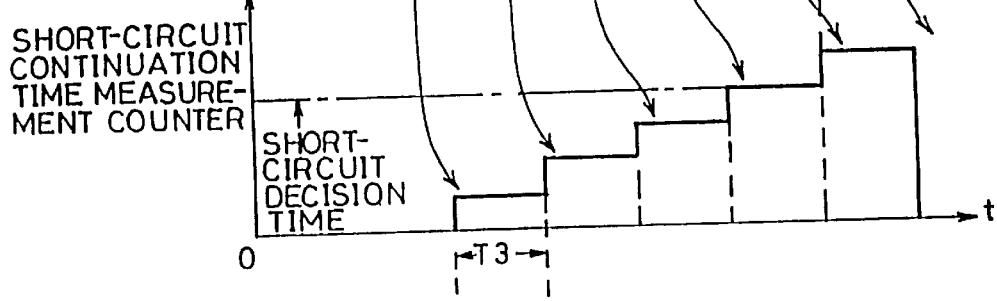
Figure 5:

The operation of the apparatus when a short-circuit failure occurs in the load is described in detail with reference to FIG. 5. When the motor 4 as an inductive load is PWM driven by the load current control means 7, a load current takes a triangle waveform around the target current, whose inclination is determined by an electric time constant $\tau$ of the load and whose frequency is the carrier frequency of PWM. When the cycle of the PWM carrier wave is set much shorter than $\tau$, the load current detection value at the time of normal operation can be regarded as a constant value equal to the target value as shown in FIG. 5(a).

When $t=t_x$ and a short-circuit failure occurs in the motor 4, since inductance and resistance seen from the load drive means 8 are extremely small at the time of a short circuit, the load current sharply increases and the load current detection value becomes much larger than the target current. Then, as the load current control means 7 functions to reduce the load current, the calculation result of the PWM duty ratio approximates to 0%. When the motor is driven at a duty ratio close to 0%, the load current which is reduced by the above time constant $\tau$ at the time of normal operation sharply decreases because inductance seen from the load drive means 8 can be ignored. Therefore, since the load current detection value at this point falls below the target current, the load current detection value becomes much larger than the target current again because the load current control means 7 increases the calculation result of the PWM duty ratio to grow the load current. Through repetitions of the above operation, the detection values of the load current become a constant value (target current) when $t=0$ to $t_x$ and take a rectangular oscillation waveform as shown in FIG. 5(a) when $t>t_x$. The short-circuit current judging means 10 stores the result of judgment on each detection current value in the RAM 18, as shown in FIG. 5(a). In the above example, the results of judgment indicate normal operation (0) when $t \leq t_x$ and a short circuit (1) and normal operation (0) alternately when $t>t_x$. The short-circuit continuation time judging means 14 checks the results of judgment during the period of the retention time T2 which are retained by the short-circuit current judgment result retaining means 13 and counts the short-circuit continuation time or clears the count value. In the above example, as shown in FIG. 5(b), the count value of the measurement counter is cleared at intervals of a measurement cycle Tc of the short-circuit continuation time when $t \leq t_x$ and is incremented by "1" at intervals of the cycle T3 when $t>t_x$. When the count value of the measurement counter exceeds the short-circuit decision time Tz, the short-circuit continuation time judging means 14 judges that a short-circuit failure occurs in the load and "1" is set in the failure flag as shown in FIG. 5(c). When "1" has been set in the failure flag, as shown in the step S58 of FIG. 3 and the step S67 of FIG. 4, the driving of the motor 4 by the load drive means 8 is stopped, the power switch means 12 is opened, and an alarm is given by the alarm means 15. In the case of the above short-circuit failure, since the average value of the load currents of the load drive means 8 is limited by the feed-back function of the load current control means 7, the load drive means 8 is protected from being damaged by a fire.

Figure 6:
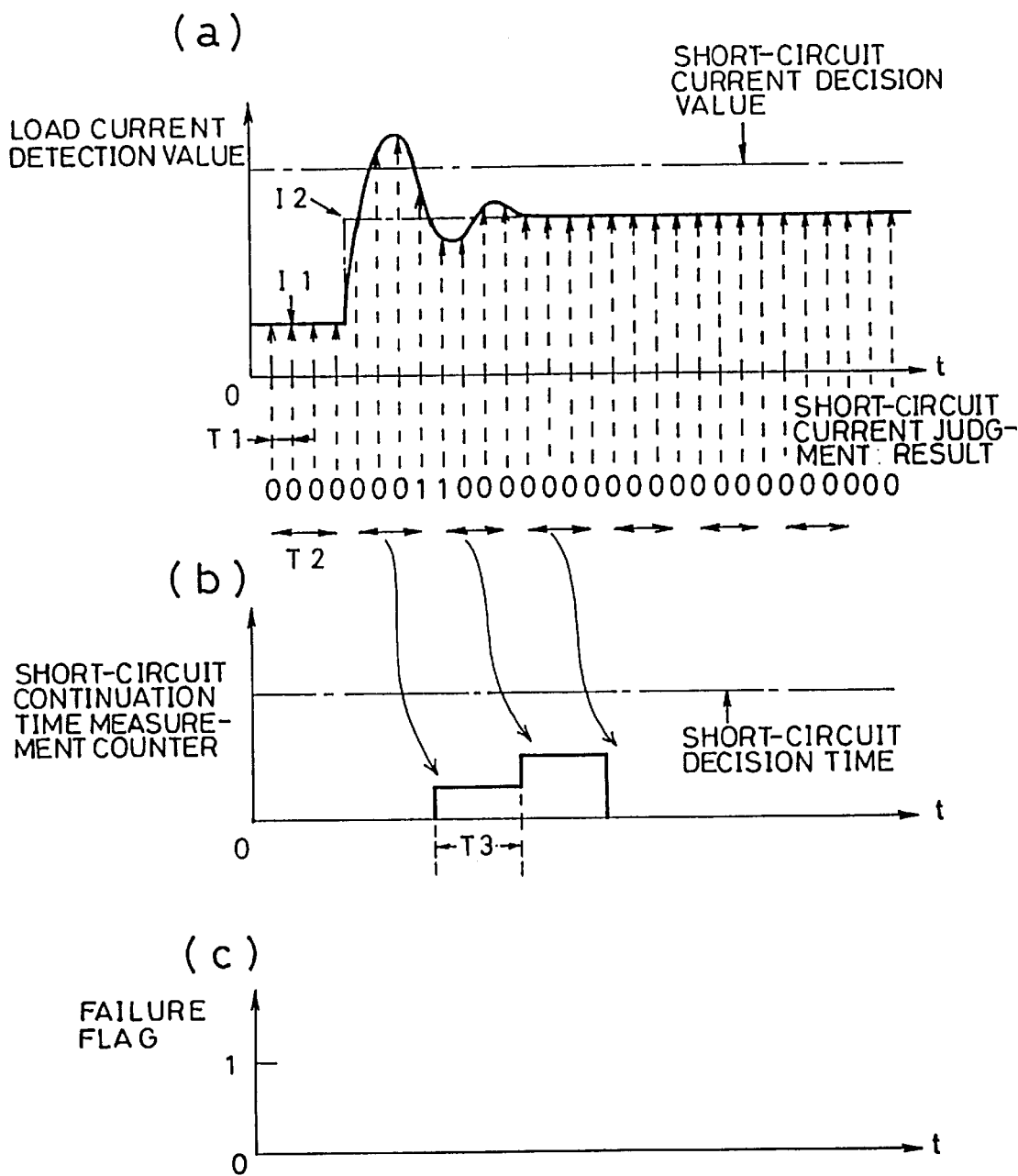
FIG. 6 is a diagram for explaining the operation of Embodiment 1 of the present invention when a load current overshoots.

The operation of the apparatus when the load current overshoots temporarily due to a sudden change in the target current is described with reference to FIG. 6. For example, when the target current grows from $I_1$ to $I_2$, the load current control means 7 increases the calculation result of the PWM duty ratio to approximate the load current to the above target current $i_2$. since a change in the above duty ratio is small when a change in the target current is small, the load current grows to the above target current i₂ smoothly. However, as a change in the above duty ratio is large when a change in the target current is large, the load current suddenly grows and overshoots as shown in FIG. 6(a). However, by the feed-back function of the load current control means 7, the load current is reduced and returns to the target current value. The results of judgment stored in the RAM 18 sequentially may indicate a short circuit (1) during the period when the load current detection value overshoots as shown in FIG. 6(a) but indicate normal operation at other time. The short-circuit continuation time judging means 14 reads the results of judgment at intervals of the cycle T3, and counts the short-circuit continuation time or clear the count value. In the above example, as shown in FIG. 6(b), since all the results of judgment indicate normal operation (0) for the next cycle T3 (first cycle after overshooting) when the count value of the measurement counter is 2, the count value of the measurement counter is cleared. Therefore, in this case, it is not judged that a short-circuit failure occurs in the load and, as shown in FIG. 6(c), "1" is not set in the failure flag. In other words, the load short-circuit failure judging means 9 judges that a sudden increase in load current is a temporary overshoot caused by a sudden change in the target current or the like and not an excessive current caused by a short circuit of the load when the short-circuit measurement time does not exceed the short-circuit decision time even if the load current value exceeds a short-circuit current value for a certain period.

Thus, according to this Embodiment 1 of the present invention, when an excessive load current runs, the load drive means 8 is protected by the feed-back function of the load current control means 7 and it is properly judged whether or not the excessive load current is cased by a load short-circuit failure. When it is judged that the excessive load current is caused by a load short-circuit failure, it is possible to stop driving the motor 4, disconnect the motor 4 from the power source and give an alarm immediately. When the load current detection value read for the feed-back control of the load current is used as the current value for judging a short circuit, processing is simplified, as shown in the above Embodiment 1 of the present invention. Since the oscillation cycle of the short-circuit current at the time of a short-circuit failure cannot be shorter than the control cycle T1 of the load current control means 7, the sampling cycle of a load current for judging a short-circuit failure which is shorter than the above control cycle T1 suffices. Meanwhile, to prevent the erroneous detection of a failure, the short-circuit decision time Tz may be set to a time (for example, several tens of msec) sufficiently longer than the current control settling time and during which a fail-safe action can be taken before danger is confronted. The above control cycle T1 is generally set to a time (for example, several hundreds of μsec) sufficiently shorter than the electric time constant of the load. Further, the measurement cycle T3 of the short-circuit continuation time is desirably set to a time (for example, several msec) sufficiently shorter than the above short-circuit decision time Tz. When the short-circuit judgment result retention time T2 is made longer than at least the above measurement cycle T3, a short-circuit failure can be detected with certainty.

Embodiment 2

Figure 7:
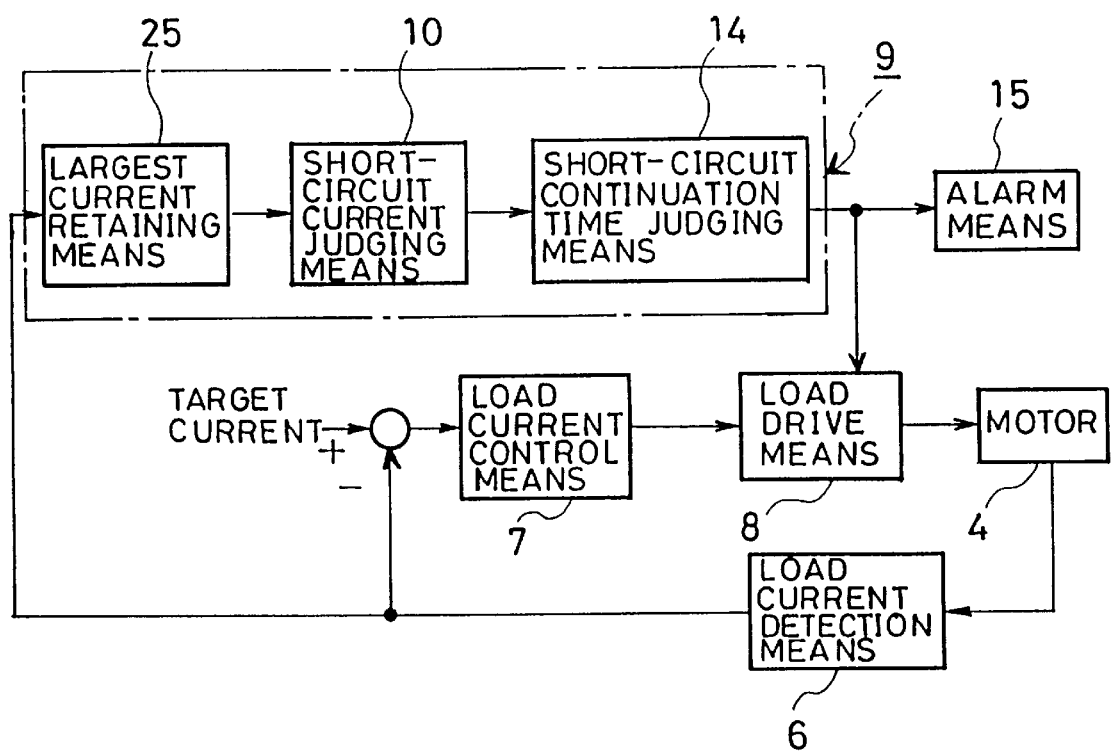
FIG. 7 is a block diagram of a load short-circuit failure detection apparatus according to Embodiment 2 of the present invention.

FIG. 7 is a function block diagram of a load short-circuit failure detection apparatus according to Embodiment 2 of the present invention. In place of the short-circuit current judgment result retaining means 13 of FIG. 1, the apparatus is provided with the largest current retaining means 25 which retains the largest current during a predetermined time T2 and judges a load short-circuit failure of the motor 4 instead of storing the result of judgment of the load current detection value in the RAM 18 and retaining it for the predetermined time T2. A circuit example of this apparatus is the same as in FIG. 2 and the microcomputer 11 attains the functions of the load current control means 7 and the load short-circuit failure judging means 9 consisting of the largest current retaining means 25, the short-circuit current judging means 10 and the short-circuit continuation time judging means 14.

Figure 8:
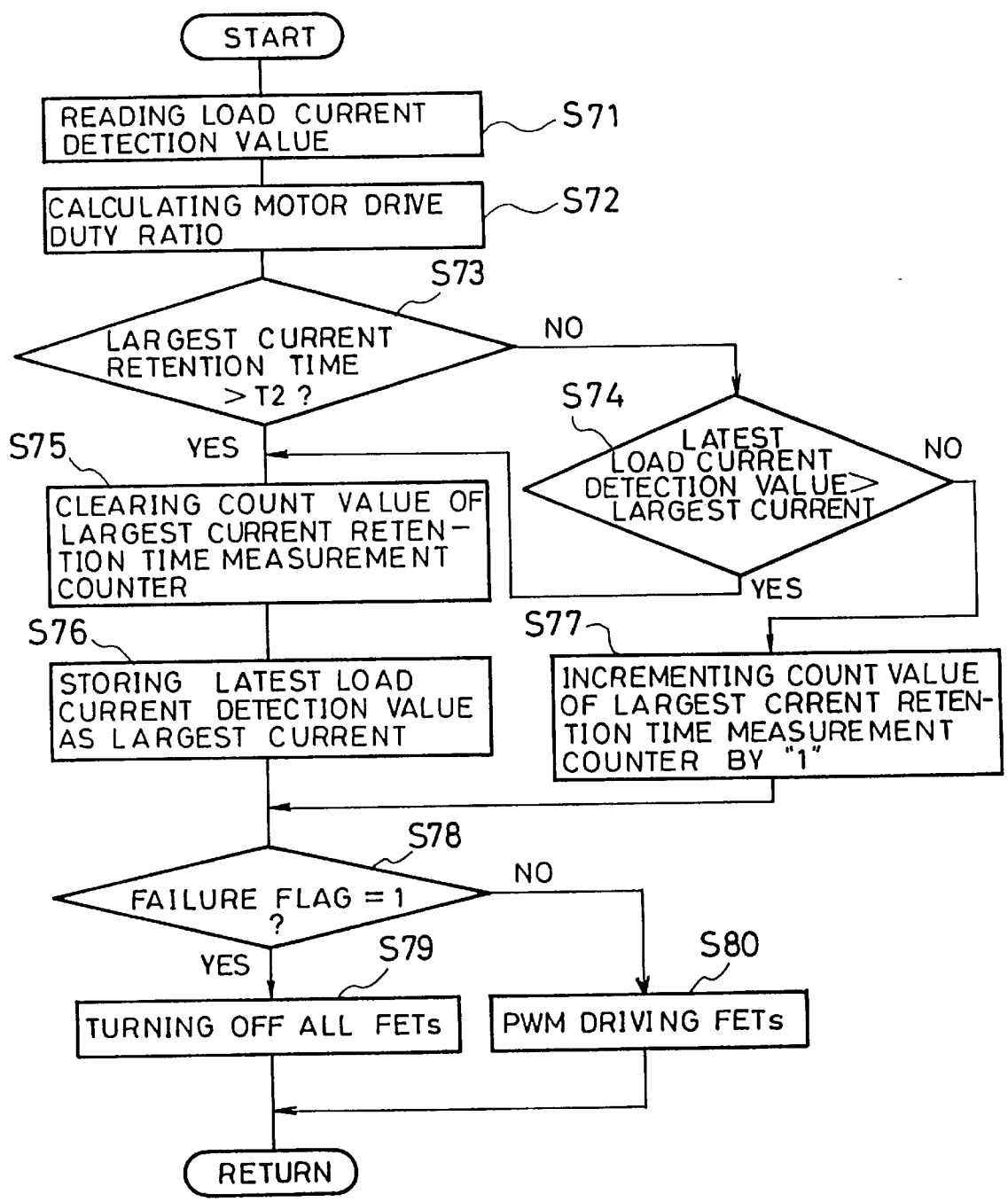
FIG. 8 is a flow chart for explaining the operations of load current control means and the largest current retaining means of the load short-circuit failure judging means of the load short-circuit failure detection apparatus according to Embodiment 2 of the present invention.

A detailed description is subsequently given of the operation of the largest current retaining means 25 with reference to the flow chart of FIG. 8. Processings from the following step S71 to S80 are read and executed at intervals of a predetermined cycle T1 (T1 is the control cycle of the drive current of the motor 4).

The CPU 16 first reads a load current detection value detected by the load current detection means 6 through the A/D converter 20 at the predetermined sampling time T1 (step S71) and calculates the duty ratio of the drive current of the motor 4 for the feed-back control of the motor current (step S72). This step S72 corresponds to the load current control means 7. Then, the CPU 16 judges whether the retention time $t_p$ of the largest current value stored in the RAM 18 exceeds the above T2 (step S73). When $t_p \leq T2$, the CPU 16 compares the latest input load current detection value with the above largest current value (step S74). When the latest input load current detection value is larger than the above largest current value, the count value of the largest current value retention time measurement counter is cleared (step S75) and this latest input load current detection value is made the largest current value (step S76). Even if $t_p > T2$, the count value of the largest current value retention time measurement counter is cleared (step S75) and the latest input load current detection value is made the largest current value (without comparison) (step S76). When the latest input load current detection value is not larger than the largest current value in the above step S74, the count value of the largest current value retention time measurement counter is incremented by "1" (step S77). The above steps S73 to S77 correspond to the largest current retaining means 25. Subsequently, the state of the failure flag determined by the short-circuit continuation time judging means 14 of the load short-circuit failure judging means 9 to be described hereinafter is checked (step S78). When "0" is set in the failure flag (the result of judgment from the load short-circuit failure judging means 9 indicates normal operation), the motor 4 is PWM driven by the load drive means 8 in accordance with the duty ratio calculated in the step S72 (step S80). When "1" is set in the failure flag (the result of judgment from the load short-circuit failure judging means 9 indicates a load short-circuit failure), the MOS FETs 24 of the load drive means 8 are all turned off to stop driving the motor 4 (step S79).

Figure 9:
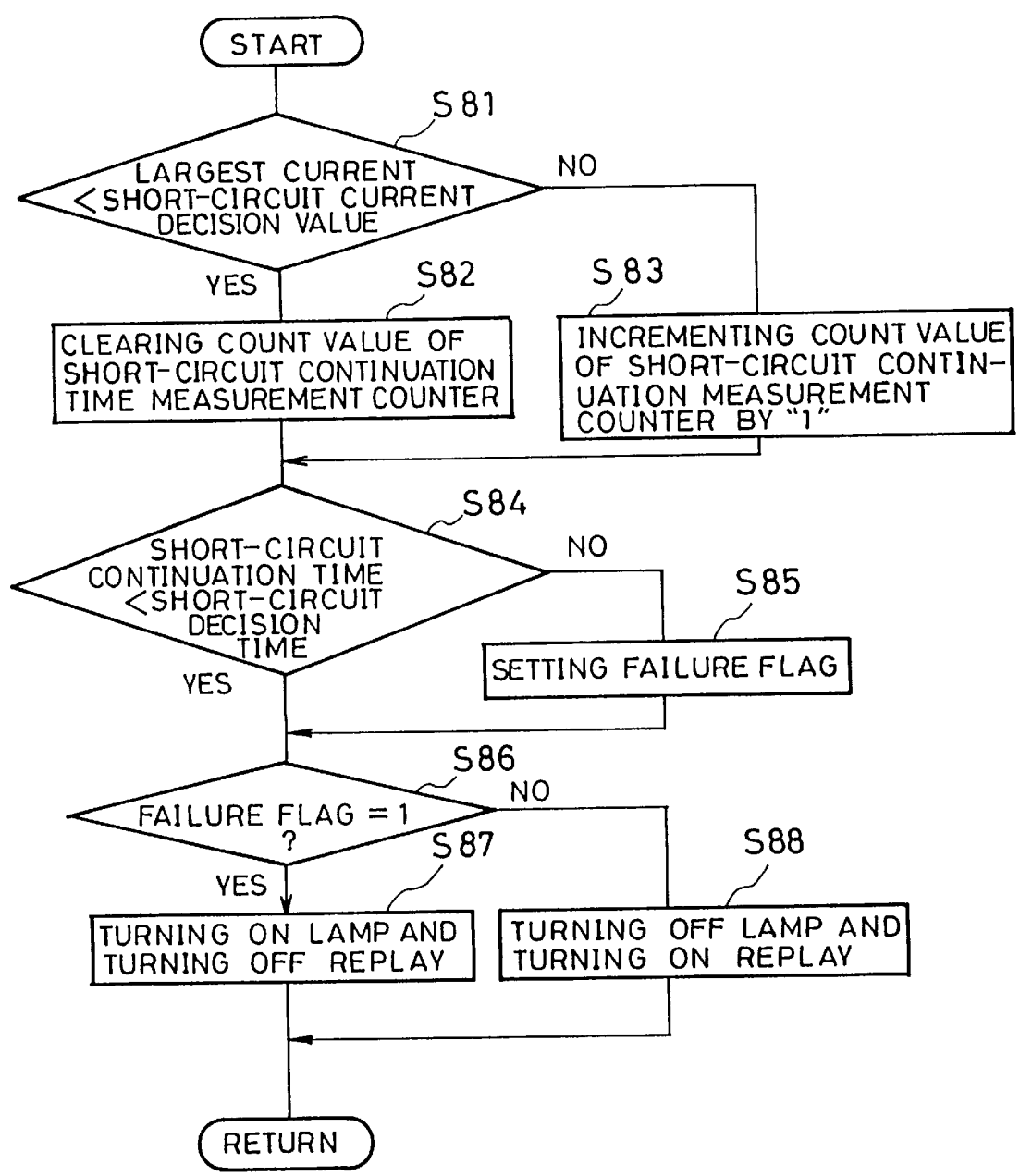
FIG. 9 is a flow chart for explaining the operation of the short-circuit continuation time judging means of the load short-circuit failure detection apparatus according to Embodiment 2 of the present invention.

A program for judging a load short-circuit failure using the largest current value during the retention time T which is stored in the RAM 18 according to the above steps S73 to S77, that is, the operation of the short-circuit continuation time judging means 14 of the load short-circuit failure judging means 9 is described in detail with reference to the flow chart of FIG. 9. The short-circuit continuation time judging means 14 compares the largest current value during the retention time T2 stored in the RAM 18 with a short-circuit current decision value (step S81). When the largest current is smaller than the short-circuit current decision value, it is considered as normal, the count value of the short-circuit continuation time measurement counter is cleared (step S82) and when the largest current value is equal to or larger than the short-circuit current decision value, the count value of the counter is incremented by "1" (step S83) to continue the measurement of a short-circuit continuation time. It is then judged whether the measurement result of the short-circuit continuation time by the counter exceeds the predetermined short-circuit decision time Tz (step S84). When the measurement result exceeds Tz, "1" is set in the failure flag (step S85). Finally, the state of the failure flag is checked (step S86). When "1" is set in the failure flag, an alarm is given by the alarm means 15 and the power switch means 12 is opened to cut off power supply to the load drive means 8 (step S87). When "0" is set in the failure flag, the alarm means 15 is turned off and the power switch means 12 is closed to supply power to the load drive means 8 (step S88). Since the state of the failure flag in the step S78 of the flow chart of FIG. 8 is determined by the result of judgment in the above step S84, when "1" is set in the failure flag, as described above, the MOS FETs 24 of the load drive means 8 are all turned off and the driving of the motor 4 is stopped. The processings from the above steps S81 to S88 are read and executed at intervals of the predetermined cycle T3 (T3 is the measurement cycle of a short-circuit continuation time).

Figure 10:
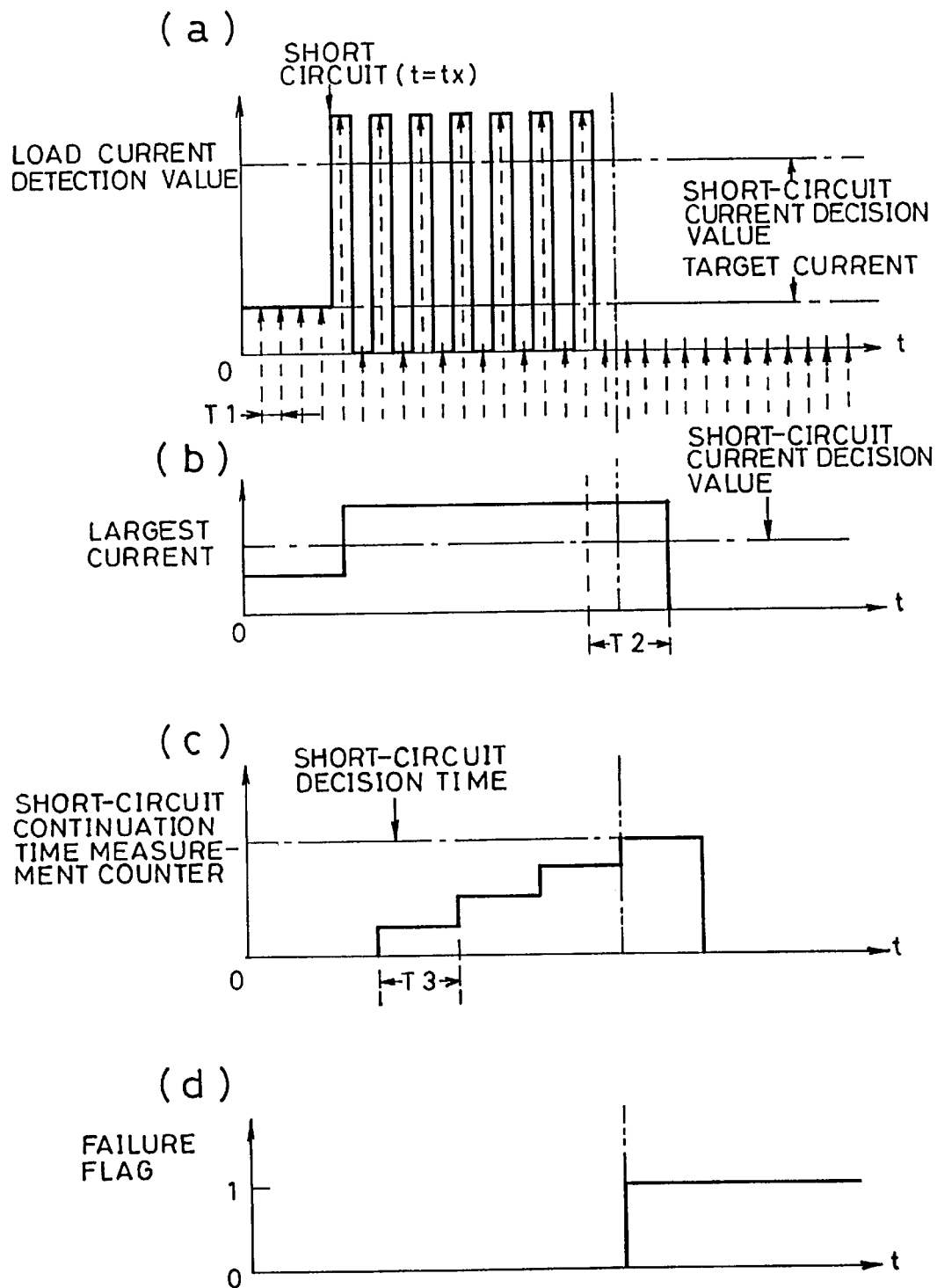
FIG. 10 is a diagram for explaining the operation of Embodiment 2 of the present invention at the time of a load short-circuit failure.

The operation of the apparatus when a short-circuit failure occurs in the load is described in detail with reference to FIG. 10. When the motor which is an induction load is PWM driven by the load current control means 7, the load current detection value at the time of normal operation becomes, as shown in FIG. 10(a), a constant value equal to the target value. If a short-circuit failure occurs in the motor 4 when $t=t_x$, the load current detection value takes a rectangular oscillation waveform. Therefore, the largest current value stored in the RAM 18 is the target current value when $t \leq t_x$ and a short-circuit current value larger than the short-circuit current decision value when $t > t_x$. Therefore, the largest current value stored in the RAM 18 increases stepwise when $t=t_x$, as shown in FIG. 10(b). The short-circuit continuation time judging means 14 checks the largest current during the retention time T2 retained by the largest current retaining means 25 and counts a short-circuit continuation time or clears the count value. In the above example, as shown in FIG. 10(c), when $t \leq tx$, the count value of the measurement counter is cleared at intervals of the measurement cycle T3 of a short-circuit continuation time. When the value of the measurement counter exceeds the short-circuit decision time Tz, the short-circuit continuation time judging means 14 judges that a short-circuit failure occurs in the load and, as shown in FIG. 10(d), "1" is set in the failure flag. After "1" has been set in the failure flag, as shown in the step S79 of FIG. 8 and the step S87 of FIG. 9, the driving of the motor 4 by the load drive means 8 is stopped, the power switch means 12 is opened, and an alarm is given by the alarm means 15. Even in the case of a short-circuit failure as described above, since the average value of the load currents of the load drive means 8 is limited by the feed-back function of the load current control means 7, the load drive means 8 is protected from being damaged by a fire.

Figure 11:
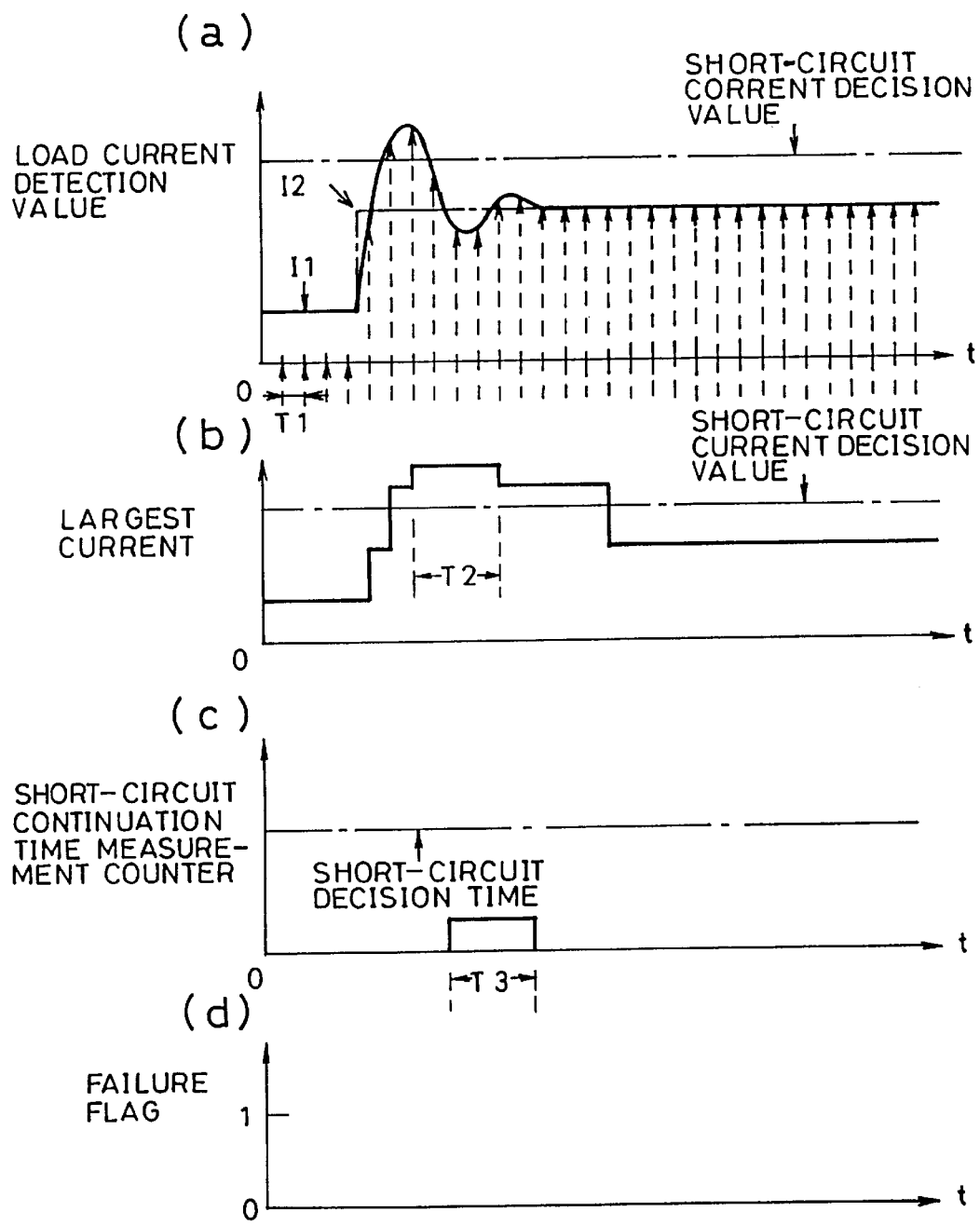
FIG. 11 is a diagram for explaining the operation of Embodiment 2 of the present invention when a load current overshoots.

The operation of the apparatus when the load current overshoots temporarily due to a sudden change in the target current is described with reference to FIG. 11. When the load current overshoots as shown in FIG. 11(a), the largest current value stored in the RAM 18 exceeds the short-circuit current decision value only during the period of overshooting as shown in FIG. 11(b). The short-circuit continuation time judging means 14 reads the above largest current value at intervals of the cycle T3, and counts a short-circuit continuation time or clears the count value. In the above example, as shown in FIG. 11(c), the count value of the measurement counter is cleared because the number of the cycles during which the current detection value overshoots is only one and the largest current falls below the short-circuit current decision value from the next cycle T3 (first cycle after overshooting). Therefore, in this case, it is not judged that a short-circuit failure occurs in the load and, as shown in FIG. 11(d), "1" is not set in the failure flag. That is, the load short-circuit failure judging means 9 judges that a sudden growth in the load current is a temporary overshooting caused by a sudden change in the target value or the like and not an excessive current caused by a load short-circuit when the short-circuit continuation time does not exceed the short-circuit decision time even if the largest value of load current exceeds the short-circuit current decision value for a certain period.

Thus, according to this Embodiment 2 of the present invention, when an excessive load current runs, the load drive means 8 is protected by the feed-back function of the load current control means 7 and it is properly judged whether or not the excessive load current is a load short-circuit failure. When it is a load short-circuit failure, it is possible to stop driving the motor 4, disconnect the motor 4 from the power source and give an alarm immediately. Since the sampling cycle of a load current for judging a short-circuit failure can be set long by using the largest current value, it is possible to lighten the load of the CPU 16.

In the above example, the largest current retaining means 25 replaces the largest current value with the latest input load current detection value when T2 elapses since the largest current value is retained or the latest input load current detection value is larger than the retained largest current value. However, the largest current retaining means 25 may retain the load current detection values during the past time T2 and judges a load short-circuit failure using the largest value during that time as the largest current.

In the above Embodiment 2 of the present invention, the largest current retaining means 25 is constituted by software. It is needless say that the same effect can be obtained when a peak hold circuit whose hold time is T2 is used to detect the largest current value for the judgment of a load short-circuit failure.

Embodiment 3

Figure 12:
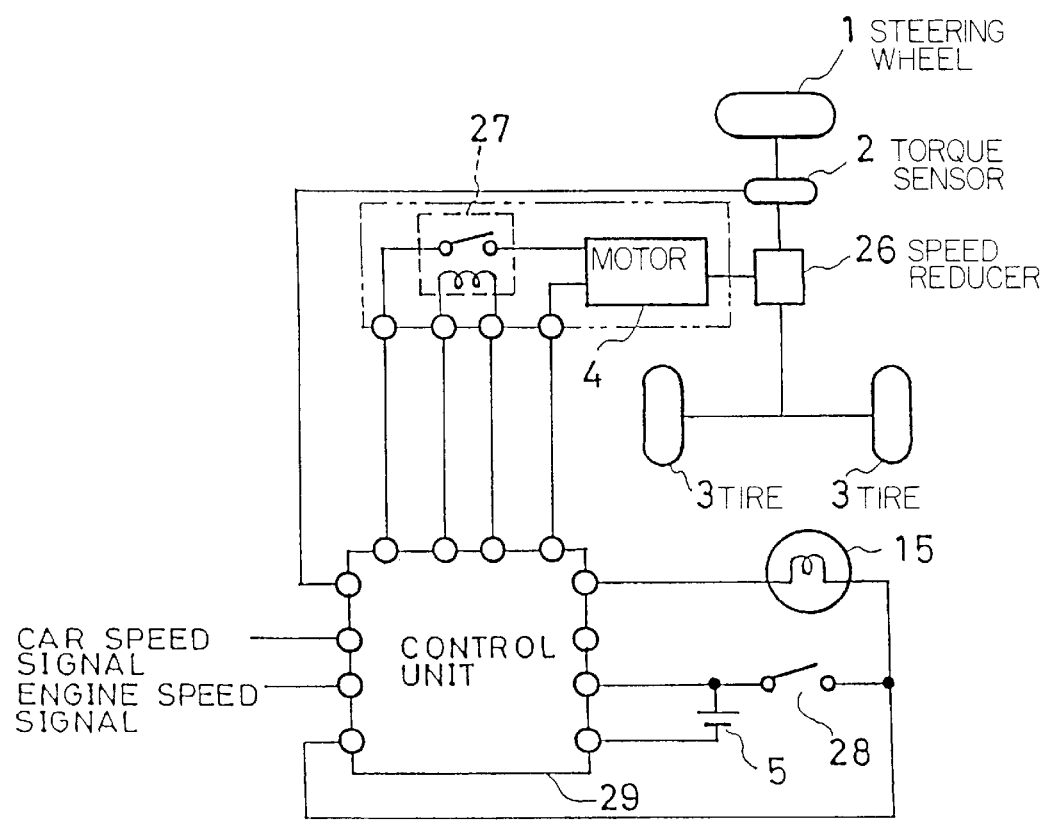
FIG. 12 is a block diagram of an electric power steering device according to Embodiment 3 of the present invention.
Figure 13:
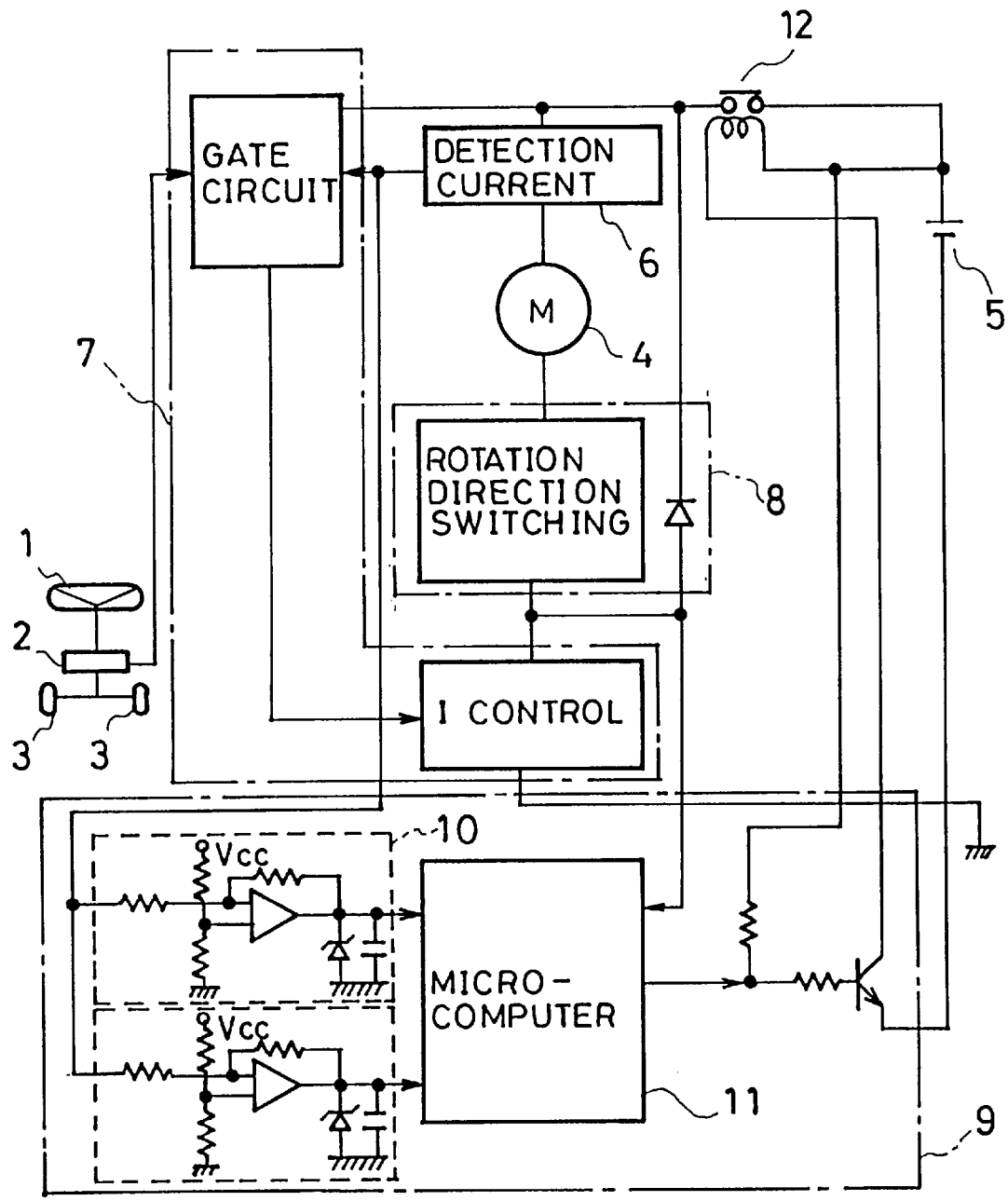
FIG. 13 is a diagram of an electric power steering device of the prior art.

FIG. 12 shows the constitution of an electric power steering device according to Embodiment 3 of the present invention. Reference numeral 1 denotes a steering wheel, 2 a torque sensor for detecting a steering torque, 3 tires, 4 a motor as an electric load to be detected for its short-circuit failure, 26 a speed reducer for transmitting an output torque of the motor 4 to a steering system, 5 a power source for supplying a current to the motor, 29 an electric power steering control unit provided with the load short-circuit failure detection apparatus according to the above Embodiment 1 or Embodiment 2, 27 motor switch means inserted into a closed circuit formed by the load drive means 8 of the load short-circuit failure detection apparatus and the motor 4, 28 an ignition switch, and 15 alarm means for giving an alarm at the time of a short-circuit failure of the motor 4.

A description is subsequently given of the operation of the above structured electric power steering device. At the time of normal operation, the control unit 29 causes the motor 4 to generate a torque so that a driver can operate the steering wheel 1 with appropriate steering force in accordance with a steering torque detected by the torque sensor 2 and a car speed signal. The output torque of the motor 4 is transmitted to the steering system through the speed reducer 26. When a short-circuit failure occurs between the terminals of the motor 4, the motor switch means 27 detects the failure by means of the load short-circuit failure detection apparatus, stops driving the motor 4 and opens the power switch means 12 incorporated in the load short-circuit failure detection apparatus of the control unit 29 and gives an alarm by means of the alarm means 15. The motor 4 generates braking force (rheostatic brake) proportional to an engine speed when it is short-circuited. Therefore, in the case of this failure, steering force increases when steering is carried out quickly. Then, in this embodiment of the present invention, the motor switch means 27 is inserted into the closed circuit formed by the load drive means 8 and the motor 4, and the motor switch means 27 is opened to prevent the rheostatic brake at the time of a load short-circuit failure in addition to the above fail-safe action when the control unit 29 detects a short-circuit failure of the load. The above fail-safe action is kept until the ignition switch 28 is opened to stop the engine.

Thus, according to this embodiment of the present invention, a short-circuit failure of the load in the electric power steering device can be detected and a fail-safe action can be taken swiftly. Though the motor switch means 27 may be provided in the control unit 29, when the motor 4 and the motor switch means 27 are integrated with each other as in the above example, it is possible to prevent the rheostatic brake of the motor 4 caused by a short-circuit failure of a wiring between the motor 4 and the control unit 29.

Embodiment 4

In Embodiment 3, the motor switch means 27 is provided in the motor 4. A clutch is provided in place of the motor switch means 27 so that it is controlled at the time of a short-circuit failure of the motor 4 to disconnect the motor 4 from the steering system.

In this case, even when steering force is increased not only by a short-circuit failure of the motor 4 but also a mechanical failure of the inside of the motor 4, the clutch 30 can be used to disconnect the motor 4 from the steering system. Thus, a safer electric power steering device can be constructed.

As described above, the load short-circuit detection apparatus of the present invention comprises load current drive means, load current control means, load current detection means and load short-circuit failure judging means and judges that a short-circuit failure occurs in the load when a state in which the load current detection value exceeds a predetermined value within a first predetermined time continues for a second predetermined time. Since the first predetermined time is made equal to or longer than the judging cycle of a load short-circuit failure, and the sampling cycle of a load current used for judging a load short-circuit failure is made equal to or shorter than the control cycle of a load current. Therefore, the load drive means can be protected and a short-circuit failure of the load can be detected. Further, the erroneous detection of a short-circuit failure caused by a transient overcurrent can be prevented.

Since the apparatus comprises the largest current retaining means for retaining the largest current detection value of the load current detection means for a first predetermined time and load short-circuit failure judging means for judging that a short-circuit failure occurs in the load when a state in which the largest current value retained by the largest current retaining means exceeds a predetermined value continues for a second predetermined time, the sampling cycle of a load current can be set long and the load of the CPU can be lightened.

Further, as the load current detection value read for the feed-back control of the load current is used to judge a load short-circuit failure, data processing can be simplified.

Since the load short-circuit failure detection apparatus of the present invention stops the driving of the load by load drive means and keeps that state when the load short-circuit failure judging means judges that a failure occurs in the load, an element used for the load drive means can be protected without fail.

Further, since switch means is provided between the power source or ground and the load drive means and opened when the load short-circuit failure judging means judges that a failure occurs in the load and this state is kept, a drive current for the motor can be be cut off even in the case of a short-circuit failure of the load drive means.

Since switch means is provided in the closed circuit formed by the load drive means and the load and opened when the load short-circuit failure judging means judges that a failure occurs in the load and that state is kept, a rheostatic brake caused by a short-circuit failure can be prevented when the load is a motor.

Further, since there is provided an alarm unit such as a lamp to give an alarm when the load short-circuit failure judging means judges that a failure occurs in the load, it can call the driver's attention precisely.

The electric power steering device of the present invention comprises load drive means, load current control means, and a motor for assisting steering force. Since a motor current is detected by the load short-circuit failure judging means, the motor is driven by the load drive means and the motor current is controlled by the load current control means, a failure of the motor can be detected while the drive circuit of the motor is protected. Further, the erroneous detection of a short-circuit failure of the motor caused by a transient overcurrent can be prevented.

Since the device also comprises clutch means which disconnects the motor from a steering system mechanically when the load short-circuit failure judging means judges that a failure occurs in the load and retains that state, safer electric power steering can be realized.

What is claimed is:

1. A load short-circuit failure detection method wherein a short-circuit failure of a load is determined when a state occurs in which a current detection value detected by the load current detection means exceeds a predetermined current value at any time within a first predetermined period of time and said state occurs in a predetermined number of immediately successive predetermined periods of time.

2. A load short-circuit failure detection apparatus comprising:
    load current detection means; and
    load short-circuit failure judging means which determines a short-circuit failure of a load when a state occurs in which a current detection value detected by the load current detection means exceeds a predetermined current value at any time within a first predetermined period of time, and said state occurs in a predetermined number of immediately successive predetermined periods of time.

3. A load short-circuit failure detection apparatus comprising:
    load current detection means;

largest current retaining means for retaining the largest value of current detection values detected by the load current detection means during a first predetermined time; and load short-circuit failure judging means which determines a short-circuit failure of a load when a state occurs in which the largest current values retained by the largest current retaining means during a predetermined number of immediately successive predetermined periods of time each exceeds a predetermined current value.

4. A load shot-circuit failure detection apparatus according to claim 2, wherein the load short-circuit failure judging means is implemented by software by sampling a current detection value detected by the load current detection means and the first predetermined time is equal to or longer than the judging cycle of a load short-circuit failure.

5. A load short-circuit failure detection apparatus according to claim 2, wherein the apparatus comprises load current control means, the load current control means and the load short-circuit failure judging means are implemented by software by sampling a current detection value detected by the load current detection means, and the sampling cycle of a load current used for judging a load short-circuit failure is equal to or shorter than the control cycle of a load current.

6. A load short-circuit failure detection apparatus according to claim 2, wherein the apparatus comprises load current control means, the load current control means and the load short-circuit failure judging means are implemented by software by sampling a current detection value detected by the load current detection means, and a load short-circuit failure is determined based on a load current detection value used for controlling a load current.

7. A load short-circuit failure detection apparatus according to claim 2, wherein the apparatus comprises load drive means, and the driving of a load by the load drive means is stopped and its state is kept when the load short-circuit failure judging means determines a failure.

8. A load short-circuit failure detection apparatus according to claim 2, wherein the apparatus comprises load drive means and switch means provided between a power source or a ground and the load drive means, and the switch means is opened and its state is kept when the load short-circuit failure judging means determines a failure.

9. A load short-circuit failure detection apparatus according to claim 2, wherein the apparatus comprises load drive means and switch means provided in a closed circuit formed by the load drive means and a load, and the switch means is opened and its state is kept when the load short-circuit failure judging means determines a failure.

10. A load short-circuit failure detection apparatus according to claim 2, wherein the apparatus comprises an alarm unit and an alarm is given when the load short-circuit failure judging means determines a failure.

11. An electric power steering device equipped with the load short-circuit failure detection apparatus of claim 2 which comprises load drive means, load current control means, and a motor for assisting steering force, wherein a motor current is detected by the load short-circuit failure judging means, the motor is driven by the load drive means, and a motor current is controlled by the load current control means.

12. A load short-circuit failure detection apparatus according to claim 2, wherein the apparatus comprises a short-circuit continuation time measurement counter which increments each time the current detection value detected by the load current detection means exceeds the predetermined value within the first predetermined time period, and determines a short-circuit failure of a load when said counter reaches a predetermined count value.

13. An electric power steering device equipped with the load short-circuit failure detection apparatus according to claim 2, wherein said electric power steering device comprises clutch means and a motor for assisting steering force, wherein the clutch means disconnects the motor from a steering system mechanically and its state is kept when the load short-circuit failure detection apparatus determines a failure.

* * * * *